United States Patent [19]

Sohie

[11] Patent Number: 5,390,133
[45] Date of Patent: Feb. 14, 1995

[54] IMAGE PROCESSOR FOR TARGET DETECTION AND TRACKING

[75] Inventor: Guy R. L. Sohie, Schenectady, N.Y.

[73] Assignee: Martin Marietta Corporation, Syracuse, N.Y.

[21] Appl. No.: 953,912

[22] Filed: Sep. 30, 1992

[51] Int. Cl.⁶ .............................................. G06K 9/36
[52] U.S. Cl. ...................... 364/516; 382/28; 382/41; 342/159
[58] Field of Search ............... 364/516, 578, 514, 572; 382/28, 36, 41, 42, 43, 10; 342/107, 108, 159, 160

[56] References Cited

U.S. PATENT DOCUMENTS

| 4,405,940 | 9/1983 | Woolfson et al. ................. 358/93 |
| 4,490,851 | 12/1984 | Gerhart et al. .................... 382/43 |
| 4,855,932 | 8/1989 | Cangiani et al. ................. 364/516 |
| 5,005,147 | 4/1991 | Krishen et al. ................... 364/578 |
| 5,062,056 | 10/1991 | Lo et al. ........................... 364/516 |
| 5,214,433 | 5/1993 | Alouani et al. .................... 342/95 |

OTHER PUBLICATIONS

"An Algorithm for Tracking Multiple Targets", Donald R. Reid, IEEE Transactions on Automatic Control, vol. AC-24, No. 6, Dec. 1979, pp. 843-854.

"Sonar Tracking of Multiple Targets Using Joint Probabilistic Data Association", T. E. Fortmann, Y. Bar-Shalom, Molly Scheffe, IEEE Journal of Oceanic Engineering, vol. OE-8, No. 3, Jul. 1983, pp. 173-184.

"Tracking in a Cluttered Environment with Probabilistic Data Association", Y. Bar-Shalom & Edison Tse, Automatica, vol. 11, pp. 451-460.

Primary Examiner—Emanuel T. Voeltz
Assistant Examiner—Edward Pipala
Attorney, Agent, or Firm—Paul Checkovich; Stephen A. Young

[57] ABSTRACT

An image processor for use in detecting and tracking a plurality of targets is provided including a plurality of memory locations for storing intensity images and a signal processor coupled to the memory locations. The signal processor comprises a closed loop feedback system for producing a plurality of intensity images for updating externally derived reference intensity images in response to at least one externally derived data image incorporating target detection signals.

23 Claims, 7 Drawing Sheets

IMAGE PROCESSOR FOR TARGET DETECTION AND TRACKING

FIELD OF THE INVENTION

This invention relates to an image processor for target detection and tracking, and more particularly, to target detection and tracking for a plurality of targets.

BACKGROUND OF THE INVENTION

A common surveillance problem is encountered when tracking a potentially large number of targets based on measurements originating from a potentially large number of sensors which may be separated over long distances. The sensors provide information regarding parameters for the location and the change in location of the targets to a central location relative to the sensor's position. Such parameters may include bearing, range, bearing rate, velocity, or position. Typically, the measurements are corrupted by random noise and deterministic bias, both of which may vary.

This problem of multitarget, multisensor detection and tracking has been approached from a number of perspectives, such as described in *Multitarget, Multisensor tracking: Advanced Applications*, by Y.Bar-Shalom, ed., published in 1990 by Artech House, Inc. One approach, as described in "An Algorithm for Tracking Multiple Targets," by D. B. Reid, published in *IEEE Transactions on Automatic Control*, Vol. AC24, No. 6, December 1979, is to use multi-hypothesis tracking. In multi-hypothesis tracking, an association is first assumed between the measurements collected and the potential targets and for every assumption, i.e. hypothesis, the target positions are updated using the measurements in question as input signals to a filter, such as a Kalman filter. The resulting error between the measurement and the filtered track is used to rank each hypothesis and as new measurements are collected the process is repeated. In practice, using multi-hypothesis tracking to solve the multitarget, multisensor tracking problem often proves intractable due to the multitude of detections, the inaccuracy of the sensor measurements, and the possibility of spurious detections, such as caused by multipath or other deterministic and/or random affects.

In other approaches, such as Probabilistic Data Association (PDA) filtering and Joint Probabilistic Data Association (JPDA) filtering, sensor measurements are combined at each point in time according to an association probability to avoid excessive computation. The association probability may be determined in accordance with specific closed form analytical expressions, such as those used for the Kalman filter, as disclosed in "Tracking in a Cluttered Environment with Probabilistic Data Association," by Y.Bar-Shalom and E. Tse, published in *Automatica*, Vol. 11, pp. 451-460 (1973), and in "Sonar Tracking of Multiple Targets Using Joint Probabilistic Data Association," by T Fortmann, Y.-Bar-Shalom, and M. Scheffe, published in *IEEE Journal of Oceanic Engineering*, Vol. OE8, No. 3, (July 1983).

These approaches suffer from several disadvantages. First, the calculation of association probabilities still requires excessive computations if the number of measurements per time interval is large. In addition, because the measurements typically have a nonlinear relationship with the target parameters, such as position or velocity, these so-called Kalman trackers may exhibit poor convergence behavior. Third, typical applications of these trackers, such as for use with sonic or electromagnetic target detection signals, suffer from poor environmental propagation conditions requiring the use of nonuniform probability of detection distributions in multitarget association; however, this technique also requires relatively simple analytical expressions for the probability distribution or density function. A need thus exists for an approach to the multitarget, multisensor tracking problem that overcomes the foregoing problems.

SUMMARY OF THE INVENTION

One object of the invention is to provide an image processor for tracking and detecting a plurality of targets having reduced computational and memory requirements relative to more conventional multitarget, multisensor trackers.

Another object of the invention is to provide an image processor for detecting and tracking a plurality of targets that is less sensitive to inaccuracies in target detection signals compared with conventional trackers.

Yet another object of the invention is to provide an image processor for detecting and tracking a plurality of targets having improved estimation accuracy compared with traditional time sequential approaches to multitarget, multisensor tracking.

An image processor for use in detecting and tracking a plurality of targets comprises: a plurality of memory locations for storing intensity images, and a signal processor coupled to the memory locations. The signal processor comprises a closed loop feedback system for producing a plurality of intensity images for updating externally derived reference intensity images in response to at least one externally derived data image incorporating target detection signals.

BRIEF DESCRIPTION OF THE DRAWINGS

The subject matter regarded as the invention is particularly pointed out and distinctly claimed in the concluding portion of the specification. The invention, however, both as to organization and method of operation, together with further objects and advantages thereof, may best be understood by reference to the following detailed description when read with the accompanying drawings in which:

DETAILED DESCRIPTION OF THE INVENTION

Figure 1:
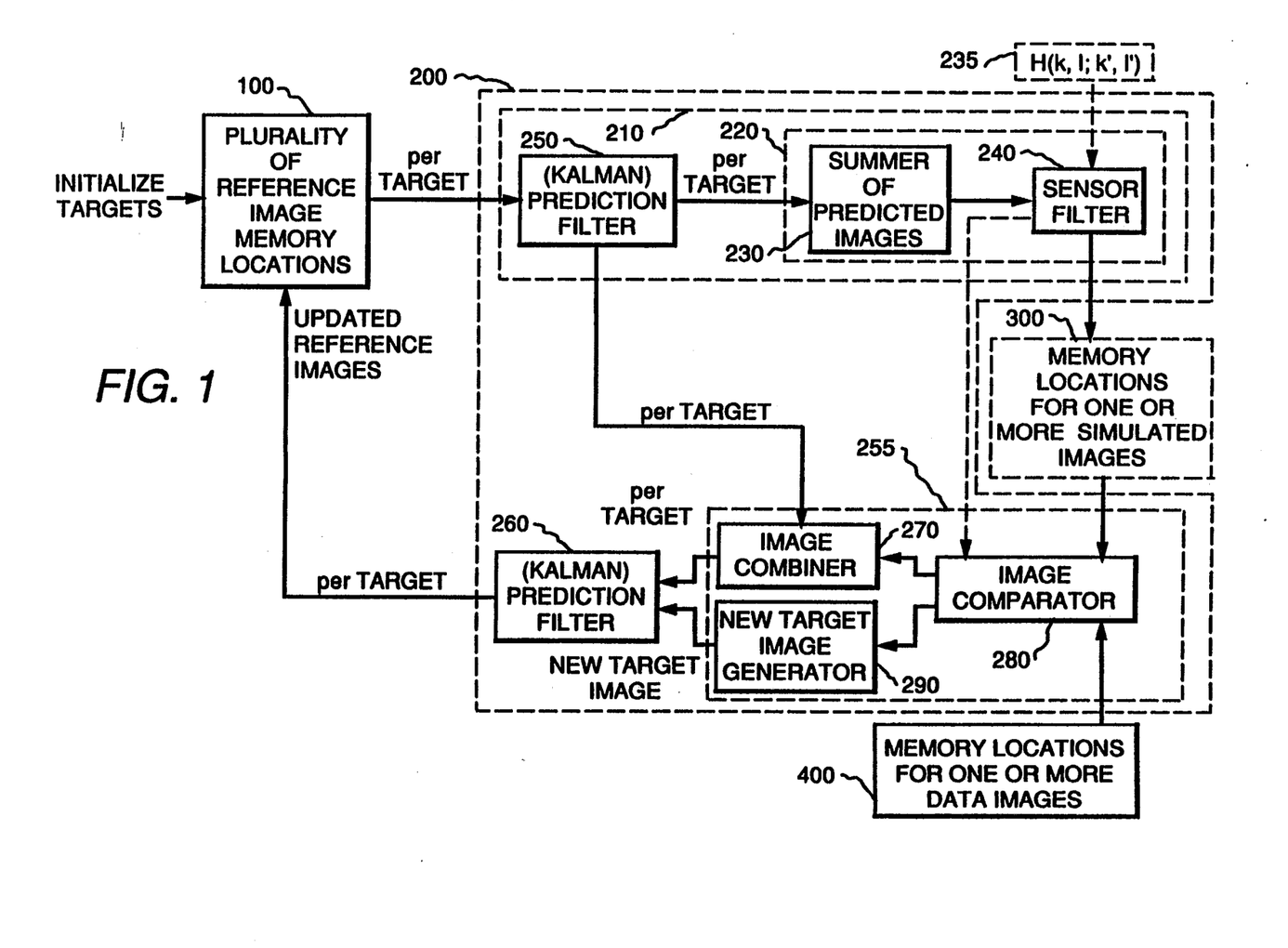
FIG. 1 is a block diagram of one embodiment of an image processor for detecting and tracking targets in accordance with the invention.

A plurality of externally derived data images are available and may be snored in a plurality of memory locations, such as memory locations 400 illustrated in FIG. 1. In this particular embodiment of the invention, each data image corresponds to a particular time $t_0, t_1 \ldots t_{N-1}$, where $t_0$ is typically the reference time for the plurality of data images. Nonetheless, the reference time is not restricted to $t_0$ and may constitute a time before $t_0$, after $t_{N-1}$, or between $t_0$ and $t_{N-1}$. The images are each comprised of a rectangular array of pixels K rows by L columns having intensity values, each pixel corresponding to a specific location in the rectangular array and having an intensity value I(k,l). As will be appreciated by those skilled in the art, intensity values may be derived from a received target detection signal amplitude or from other information, such as histogram data. Thus, in this embodiment, each pixel contains the number of target detections which occurred over the pixel "area" in a time interval $t_{i-1}$ to $t_i$.

Each data image incorporates target detection signals, such as vibrational energy signals received, for a plurality of targets by a plurality of sensors. It will be appreciated that vibrational energy signals may take a number of forms, such as electromagnetic or sonic signals. The images may originate from a number of possible sources, such as conventional sonar or radar systems, although the invention is not limited in this respect. One possible source for such a data image incorporating received target detection signals for a plurality of targets may be the output of a phased array sonar system providing correlogram target information in the digital image format previously described. Alternatively, as will be appreciated by those skilled in the art, target detection signals may be received and then converted to this digital image format.

In the embodiment of the invention illustrated in FIG. 1, a plurality of externally derived reference intensity images are stored in a plurality of memory locations 100. Each reference image may incorporate initial target detection signals for at least one target. These images may originate from a number of sources, such as from intelligence information or other information regarding the location and the change in location of the target during a particular time interval or, alternatively, from processing a different set of data images for the same targets using an embodiment of an image processor in accordance with the invention. Likewise, the reference images may be initialized with substantially uniform intensity values indicating no information regarding the location or change in location of the targets and an image processor in accordance with the present invention may be employed to extract updated reference images from the data images provided, as described hereinafter.

Typically, each initially identified target will have two reference images associated with it, an image incorporating information regarding location, such as position, and an image incorporating information regarding change in location, such as velocity. As will be appreciated by those skilled in the art, the invention is not limited in scope to images containing target information in this particular form. For example, images may incorporate such target information in terms of bearing and range.

In this particular embodiment of the invention, reference images providing information regarding the position and velocity of a plurality of targets are applied to signal processor 200 a pair of images at a time, i.e., on a per target basis. As will be appreciated by those skilled in the art, signal processor 200 typically may comprise a digital signal processor; alternative embodiments may comprise a microprocessor, an application specific integrated circuit (ASIC), a general purpose digital computer, a massively parallel processor (MPP), or another type of parallel processor. In the embodiment illustrated in FIG. 1, signal processor 200 comprises a closed loop feedback system including a simulation filter 210. Simulation filter 210 includes a prediction filter 250, which may be a Kalman prediction filter, and a sensor simulation filter 220. The closed loop feedback system of signal processor 200 further includes an image generator 255 and a prediction filter 260, as illustrated in FIG. 1. As will be appreciated by those skilled in the art, a multitude of possible arithmetic/logic circuits may be employed for prediction filters 250 and 260, sensor simulation filter 220, and image generator 255 to enable these image processor elements to perform the image filtering and image forming described hereinafter.

The reference images are first applied to prediction filter 250 in signal processor 200. In those instances where the plurality of memory locations 400 includes only one data image, prediction filter 250 projects or predicts the location of the target in response to the reference images for a given target for the time interval corresponding to the time interval during which the received target detection signals incorporated in the data image would have indicated that the target was sensed or detected. It will be understood that this prediction may be either forward or backward in time relative to the time interval corresponding to the reference images. Alternatively, where memory locations 400 include a plurality of data images at times $t_0$ through $t_{N-1}$, where $t_0$ is the reference time in this particular embodiment, prediction filter 250 predicts the location of a given target for each time interval from $t_1$ to $t_{N-1}$.

In an embodiment in which the prediction filter comprises a conventional Kalman prediction filter, the position and velocity of the targets may be predicted in accordance with the following equations:

$$x(t_{n+1}) = x(t_n) + v_x(t_n)(t_{n+1} - t_n)$$

$$y(t_{n+1}) = y(t_n) + v_y(t_n)(t_{n+1} - t_n)$$

$$v_x(t_{n+1}) = v_x(t_n)$$

$$v_y(t_{n+1}) = v_y(t_n),$$

where $x(t_n)$ denotes the target's position at time $t_n$ in the x direction, such as along columns k, $y(t_n)$ denotes the target's position at time $t_n$ in the y direction, such as along rows l, and $v_x$ and $v_y$ denote the target's velocity in the x and y directions respectively. Likewise, the covariances are predicted by:

$$r_x(t_{n+1}) = r_x(t_n) + 2(\Delta t)$$
$$r_{x,vx}(t_n) + r_{vx}(t_n)(\Delta t)^2 + g_x(\Delta t)^2$$

$$r_{x,vx}(t_{n+1}) = r_{x,vx}(t_n) + r_{vx}(t_n)(\Delta t),$$

where $r_x$ is the variance of the target position in the x direction, $r_{vx}$ is the variance of the target velocity in the x direction, $r_{x,vx}$ is the covariance between the target position and the target velocity, and $g_x$ is the "innovations" variance traditionally calculated in Kalman filtering to express the additional uncertainty introduced over time period $\Delta t$, or $t_{n+1} - t_n$, such as disclosed in *Introduction to Discrete-Time Signal Processing*, by Steven A. Tretter, published by John Wiley & Son, Inc. (1976). As will be appreciated by one skilled in the art, corresponding expressions predict the covariances for the y direction. In the context of the present invention, a conventional Kalman prediction filter may be used for prediction filter 250 most effectively where the reference intensity images are stored as compressed intensity images, as described hereinafter.

Figure 5:
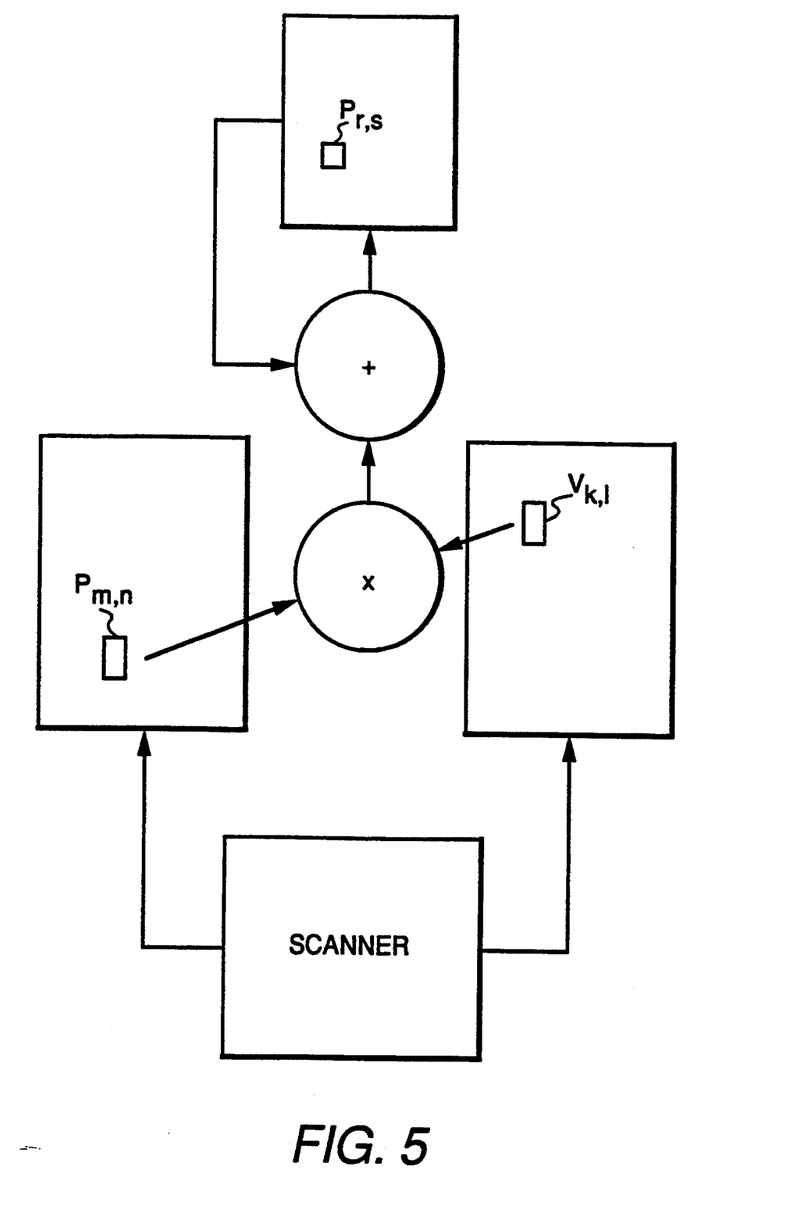
FIGS. 5 and 6 illustrate alternative embodiments of a prediction filter for incorporation in an image processor in accordance with the invention.

An alternative embodiment for a prediction filter in accordance with the invention is as follows. As illustrated in FIG. 5, a predicted or projected intensity image for a position of a target, such as comprised of pixels $P_{r,s}$, may be constructed by scanning the reference velocity image for that target for each velocity, such as $V_{k,l}$. It will be appreciated that each pixel $V_{k,l}$ in a velocity intensity image, such as the reference velocity image, corresponds to two mutually orthogonal components of velocity respectively represented by the horizontal and vertical displacement of the pixel in the intensity image. The predicted position image for that target is constructed by predicting forward or backward in time from every pixel in the reference position image, such as Pm, n, to the predetermined or predicted time and accumulating the image intensities formed by multiplying the corresponding intensity values in the position image and the velocity image for that target. After normalization, this results in a target position image at the predicted time similar to the position image for that target at the reference time.

Where memory locations 400 include only a single data image, prediction filter 250 predicts the location of each target as previously described and these predicted target position images are provided to sensor simulation filter 220. Filter 220 first sums or superpositions the predicted images produced by filter 250, such as by summer 230, to form a single target prediction image representing the predicted locations of the targets during the time interval in that the targets were sensed or detected. This superposition image or target prediction image is then provided to a sensor filter 240 to produce a simulated intensity image of the data image stored in memory locations 400.

As illustrated in FIG. 1, the simulated image may be stored in a plurality of memory locations 300. Nonetheless, as will appreciated by those skilled in the art, the simulated image may be alternatively provided directly from sensor filter 240 to image generator 255, as shown in FIG. 1 by a dashed arrow. Sensor filter 240 simulates the effect of the sensor environment by reproducing the effect the presence of a target at a particular location has on the data image. No details regarding the particulars of the filter are provided here since they will depend upon the particular sensor, and effects from multipath, acoustic propagation characteristics, background clutter, etc. Nonetheless, in this particular embodiment of the invention, the sensor filter is implemented as a set of weighting coefficients or weights 235 expressing the effect that the presence of a target in a pixel location has on the pixels in the target position image. Thus, a particular weighting coefficient of the sensor filter $H(k,l;k',l')$ expresses the effect on the synthesized or simulated pixel value at pixel $(k',l')$, given the presence of a target at pixel $(k,l)$. The simulated image may be produced by a convolution operation of the target prediction image with the sensor filter weights Thus, for each pixel $(k',l')$ it is determined which pixels $(k,l)$ of the target position image have an effect. This determines which weights of the sensor filter are used to update pixel $(k',l')$ Thus, the simulated intensities are obtained by a multiply and accumulate operation. As illustrated in FIG. 1 in shadow, the externally derived sensor filter weights may be periodically updated as the characteristics of the medium change, such as over time. Likewise, the sensor filter may comprise either a simulation or an analytical expression for such sensor environment effects.

A simulated image for storage in memory locations 300 is then produced and applied to the image generator portion 255 of signal processor 200 executing the image generation. Ultimately, the predicted images provided by prediction filter 250, the simulated image stored in memory locations 300 and the data image stored in memory locations 400, are combined by signal processor 200; however, in this embodiment of the invention several steps are executed before such image generation or formation takes place. First, an image comparison is performed by an image comparator 280 to compare the simulated image with the data image to determine whether the simulated image has converged to the data image.

A number of methods for determining convergence between intensity images are possible. Typically, the images are compared on a pixel-by-pixel basis. In one approach the differences in corresponding pixel intensity values may be summed and that sum may be compared to a predetermined amount. Alternatively, the differences in corresponding pixel intensity values may be squared and the sum of the squares may be compared to a predetermined amount. Likewise, the magnitude of the difference in corresponding pixel intensity values on a pixel-by-pixel basis may be compared to a predetermined amount. In yet another alternative, the difference in corresponding pixel intensity values on a pixel-by-pixel basis may be squared and compared with a predetermined amount. Many other techniques for determining convergence may occur to one skilled in the relevant art and the invention is not limited in scope to the techniques enumerated. If the simulated image has not converged to the data image, additional images are formed by image generator 255.

An image combiner 270 constructs or forms a plurality of combined images based on the comparison of the simulated image and the data image described above. In one embodiment of the invention, a plurality of combined images are formed in accordance with the following equation:

$$C_k = P_k \times D_k / S_k,$$

where $C_k$, $P_k$, $D_k$ and $S_k$ are the image intensities of corresponding pixels of, respectively, the combined image being formed by the image generator, the particular predicted image, the data image, and the simulated image. It will be appreciated that to simplify image filtering and image generation, intensities may be stored or processed in logarithmatic form and converted from that form as needed. It will be likewise be appreciated that the images may be combined in accordance with a number of other equations chosen to reflect the differences between the data image and the simulated image and provide those differences as a correction to each of the predicted images, such as a function of either $D_k/S_k$, given by $f(D_k/S_k)$, or $D_k - S_k$, given by $f(D_k/S_k)$, or a combination thereof. For example, an alternative equation might be $C_k = P_k + D_k - S_k$.

Once the combined images are formed or generated as previously described, they are provided to prediction filter 260 to predict or project the location of the targets backward or forward in time to the reference time in order to produce updated reference images. As will be appreciated by one skilled in the art, prediction filter 260 may comprise a Kalman prediction filter, as previously described regarding prediction filter 250. Alternatively, the prediction filter may employ a similar technique as previously described regarding prediction filter 250 for using a target position image and a target velocity image to produce a predicted target position image for the reference time constituting an updated reference image. The reference images are then replaced with the updated reference images in memory locations 100. In the instance where memory locations 400 include only one data image, the reference velocity images for each target may be updated by filtering the combined target position image and the corresponding reference position image for that target to produce an updated reference velocity image for the target. As described hereinafter, in conjunction with a plurality of data images, a plurality of combined images for a target may be filtered to produce an updated reference velocity image for that target. Alternatively, as described hereinafter, the prediction filters may be omitted if only one data image is involved.

After the reference images have been updated, the feedback process previously described for producing a simulated image is repeated. If convergence has not occurred, the reference images are again updated. Thus, as will be appreciated by one skilled in the art, signal processor 200 executes a closed loop feedback system for producing a simulated image from the updated reference images until the simulated image converges to the data image.

Another aspect of the operation of this feedback system occurs after convergence between the data image stored in memory locations 400 and the simulated image stored in memory locations 300. If convergence has occurred, then the differences between the data image and the simulated image, e.g., $D_k - S_k$ in this embodiment, termed the residuals, are filtered. In particular, the residuals should be sufficiently close to uniform with a small enough amplitude, such as on the order of a multiple of the quantization noise, to indicate that all of the targets have been detected. If convergence has occurred, but the residuals are not uniform or have an excessively large amplitude, the presence of a yet unidentified target in the data image is likely. In this particular embodiment of the invention, the residuals, or their logarithms as previously described, are summed and compared with a predetermined amount. If the sum exceeds a predetermined amount, a new or additional target image may be generated by new target image generator 290 in FIG. 1.

A number of possible techniques for filtering the residuals and for forming an additional target image are possible. One technique is to filter the residuals for the row and column pixel locations of the mean intensity in the image and for the variance in those row and column pixel locations, and to construct a two-dimensional Gaussian distributed intensity image having substantially the same row and column pixel values for the mean and variance. In yet another technique, the image may be "thresholded" to identify peaks or spikes in the image before performing the filtering described above. As indicated in FIG. 1, the new or additional target image is then provided to prediction filter 260, which performs prediction backward or forward in time to produce a reference image at the reference time corresponding to the newly identified target. In this instance, where a single data image is included in memory locations 400, a substantially uniform target velocity image may prove satisfactory for such prediction.

As will now be appreciated, another simulated image is now constructed, based on the previous plurality of reference images and the additional position and velocity reference images for the newly identified target. Again, image filtering and generation is conducted until convergence occurs. When convergence is attained and the residuals are sufficiently uniform or sufficiently small to indicate that all targets have been identified, processing of the data images is complete.

In those instances where memory locations 400 include a plurality of data images, the embodiment of the image processor illustrated in FIG. 1 operates in substantially the same manner as previously described. Prediction filter 250 predicts the location of the target in a given reference image during the time intervals corresponding to each data image. Thus, filter 250 produces a predicted image for each target for each time interval. These images are provided to filter 220, in which for each time interval, the predicted images corresponding to the targets are superpositioned or summed, as indicated by summer 230, and then convolved with sensor filter 240 to produce a plurality of simulated images in which a simulated image corresponds to each data image.

Figure 6:
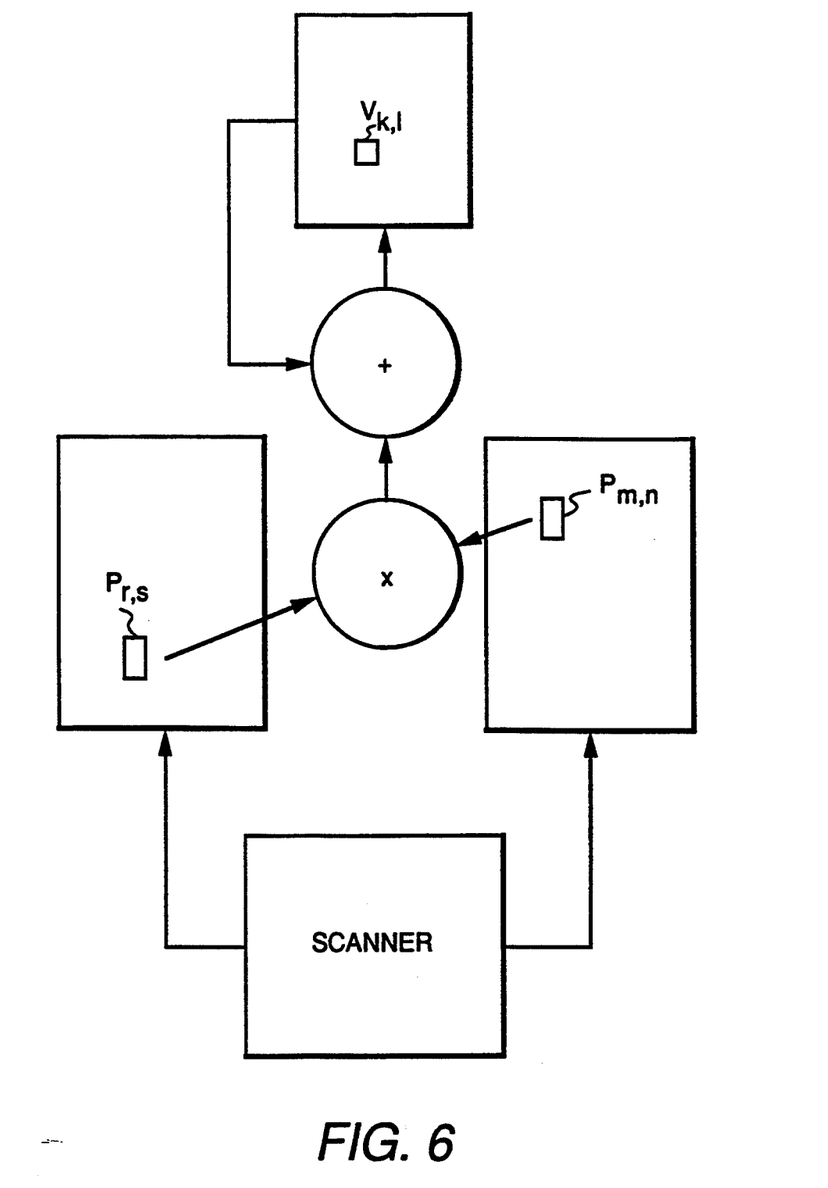

Each simulated image is then compared with its corresponding data image to determine whether convergence has occurred. As described previously, determination of convergence will depend on the particular method employed; however, all simulated images should demonstrate convergence to conclude that it has taken place. If convergence has not occurred, a plurality of combined images are constructed, again as previously described. Thus, a combined image is produced for each target for the time intervals corresponding to each data image. All of the combined images corresponding to the time intervals for a given target are then provided to prediction filter 260 which projects backward or forward in time to the reference time to produce a single updated reference position image for that target. This is accomplished by first filtering the combined images to produce an updated reference velocity image for that target. For example, as illustrated in FIG. 6, from two different position intensity images for the same target histograms are constructed or compiled for each velocity. The velocity histogram is produced by determining a hypothetical velocity $V_{k,l}$ between every pixel pair $P_{r,s}$ and $P_{m,n}$ in the respective target position images and assigning to that velocity the product of the image intensities for these pixels in the position images. Thus, these histograms provide the velocity of the target at the reference time by assuming the target velocity is constant over the relevant time period. This is done between various pairs of target position images with the intensities assigned to corresponding velocities being summed. Likewise, if any images having velocity information, such as a reference target velocity image, for example, are produced by external target detection systems, such as radar or sonar, the corresponding intensity values for each velocity may also be summed. After summing the intensities for each velocity, the image is normalized. Then, as previously described, each combined image for the target is projected backwards or forwards to the reference time, and these images are superpositioned and normalized to provide the updated reference position image.

This process of image filtering, image generating, and reference image updating is repeated until convergence occurs. At this point, the residuals of each of the simulated images after removing each of the corresponding data images are evaluated, as previously described, to determine whether additional target images should be generated or constructed. If these images are formed, again as previously described, the process of filtering and image generation is repeated until convergence again occurs and until the residuals comprise a substantially uniform distribution or exhibit sufficiently small amplitudes.

Additional reference images for a newly identified target may be generated by one of a number of approaches in the instance where memory locations 400 include a plurality of data images. Each simulated image corresponding to one of the stored data images may be removed from its corresponding data image to produce a set of residual images, a residual image corresponding to each data image. In one approach, not shown in FIG. 1, each of the residual images may be projected by prediction filter 260 either forward or backward to the reference time to correspond with the reference images. At this point, to produce a position image for the newly identified target the residual images may be superpositioned, normalized, and filtered for the row and column pixel locations for the mean intensity and for the variance in these row and column pixel locations, as previously described. Alternatively, one of the residual images may be selected, such as the residual image having the least uniform residuals or having the residuals of greatest intensity, and a target position image may be generated from the residuals by new target image generator 290. A target velocity image for the newly identified target may be generated by first producing a velocity image for the plurality of targets from the data images stored in memory locations 400, such as by the technique described in conjunction with FIG. 6. Then, the residuals remaining after removing each of the reference velocity images from the velocity image produced from the data images may be filtered by any one of the techniques herein described to generate a velocity image for the newly identified target. These position and velocity target images may then be applied to prediction filter 260 to provide additional reference images for the plurality of reference images stored in memory locations 100.

Figure 1A:
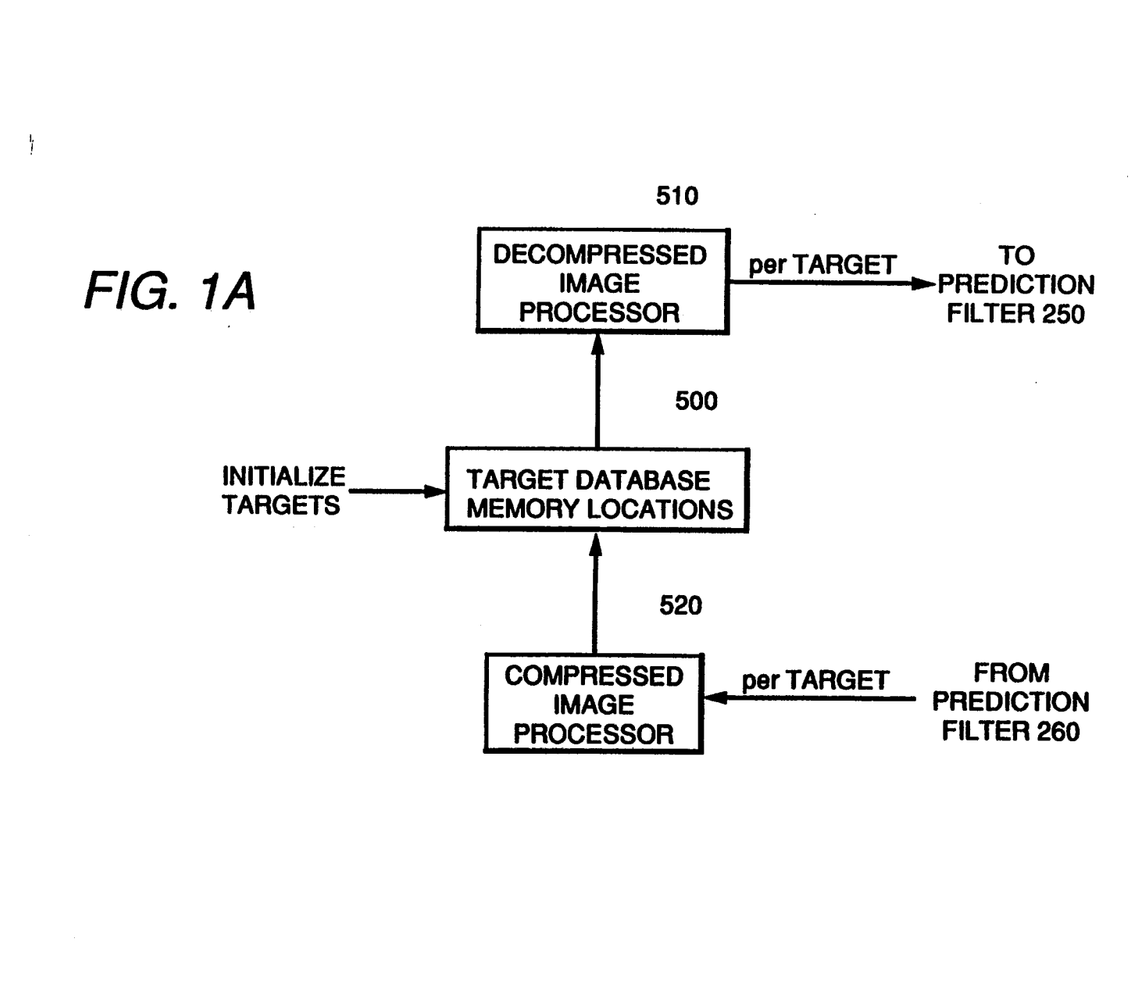
FIG. 1A is a block diagram illustrating a portion of an alternative embodiment of an image processor for tracking and detecting targets in accordance with the invention.

An alternative embodiment of an image processor for target detection and tracking in accordance with the present invention is shown in FIG. 1A. The embodiment illustrated in FIG. 1A is substantially identical with the embodiment in FIG. 1 except that memory locations 100 coupled to signal processor 200 of FIG. 1 are replaced with a target database 500 comprising memory locations for storing compressed target position and target velocity intensity images. Thus, for each of the reference images stored in memory locations 100 in FIG. 1, target database 500 has stored a corresponding compressed intensity image. FIG. 1A further illustrates a signal processor 510 for decompressing the image before applying it to prediction filter 250 and a signal processor 520 for compressing the image after the image has been produced by prediction filter 260.

In the context of the present invention, the digital intensity images are filtered for reduced memory storage utilization in accordance with the following method. The intensity images to be filtered or compressed are comprised of $K \times L$ pixels arranged in K rows and L columns of sampled intensity values, each of these sample intensity values being denoted $I(l,k)$ with l and k corresponding to the row and column location of the sampled intensity value. The method comprises the steps of transmitting the sampled intensity values $I(k,l)$ to a signal filtering device, such as a digital signal processor, filtering these sample intensity values with the signal filtering device to produce at least four pixel values providing a compressed digital intensity image, and storing the four filtering-produced pixel values in memory locations. The step of filtering the sampled intensity values comprises the steps of filtering the sampled intensity values to produce an estimate of the row pixel location corresponding to the mean of the sampled intensity values and an estimate of the variance of that pixel location, and filtering the sampled intensity values to produce an estimate of the column pixel location corresponding to the mean of the sampled intensity values and an estimate of the variance of that pixel location. Alternatively, the step of filtering the sampled intensity values may comprise the steps of filtering the sampled intensity values to produce estimates of the row pixel location with the maximum intensity and the extent in pixels away from that location of intensity values x % of that maximum intensity, where x is between 0 and 100 inclusive, and filtering the sampled intensity values to produce estimates of the column pixel location with the maximum intensity and the extent in pixels away from that location of intensity values y % of that maximum intensity, where y is between 0 and 100 inclusive. Typically, the mean and estimates, $\overline{K}, \overline{L}$, and variance estimates, $\overline{S}_K, \overline{S}_L$, are calculated in accordance with the following equations:

$$\begin{bmatrix} \overline{K} \\ \overline{L} \end{bmatrix} = \frac{\sum_{k,l=0}^{K-1,L-1} \begin{bmatrix} k \\ l \end{bmatrix} I(k,l)}{\sum_{k,l=0}^{K-1,L-1} I(k,l)}$$

$$\begin{bmatrix} \overline{S}_{K^2} \\ \overline{S}_{L^2} \end{bmatrix} = \frac{\sum_{k,l=0}^{K-1,L-1} \begin{bmatrix} k^2 \\ l^2 \end{bmatrix} I(k,l)}{\sum_{k,l=0}^{K-1,L-1} I(k,l)} - \begin{bmatrix} \overline{K}^2 \\ \overline{L}^2 \end{bmatrix}$$

Figure 2:
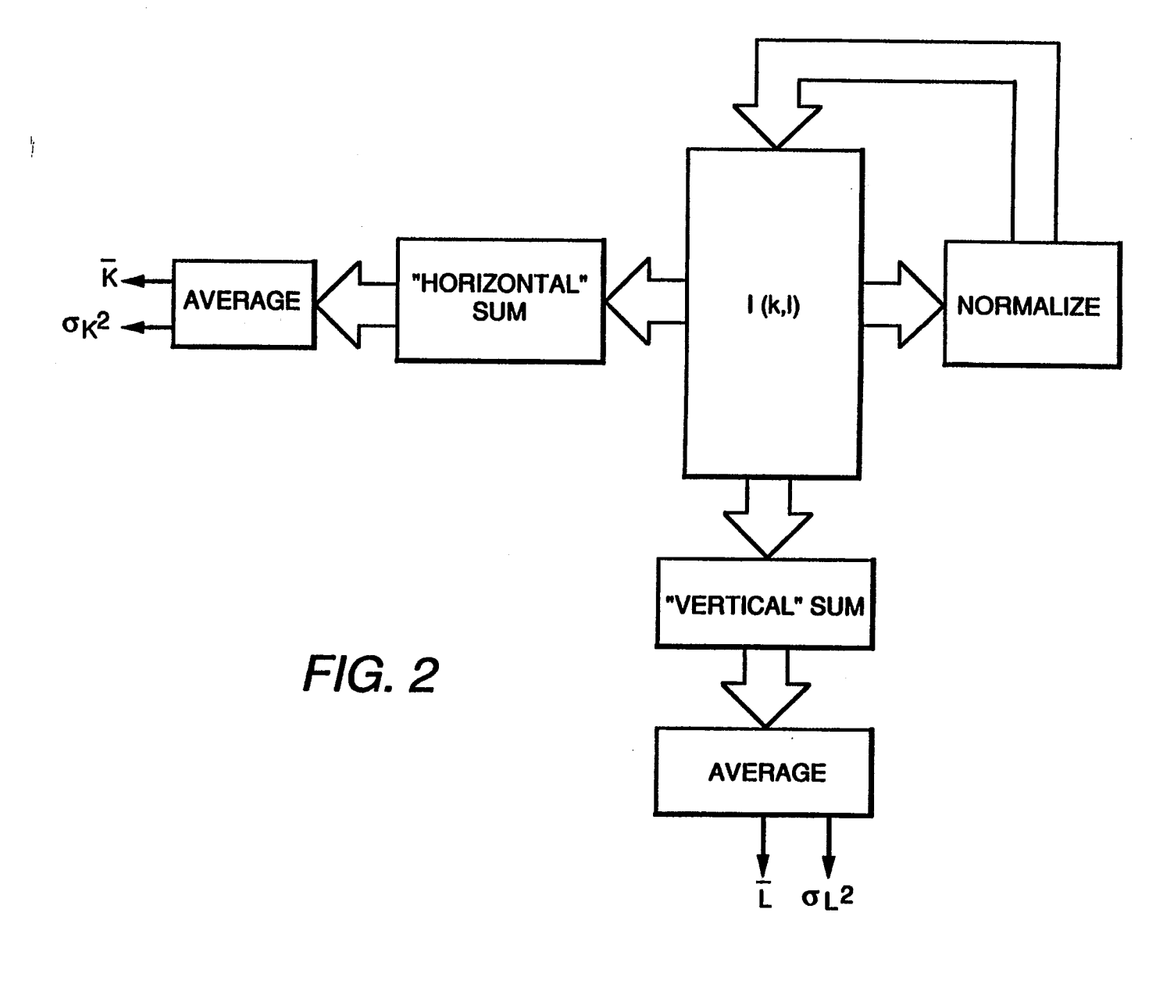
FIG. 2 illustrates one embodiment of a method for producing compressed intensity images in accordance with the invention.
Figure 3:
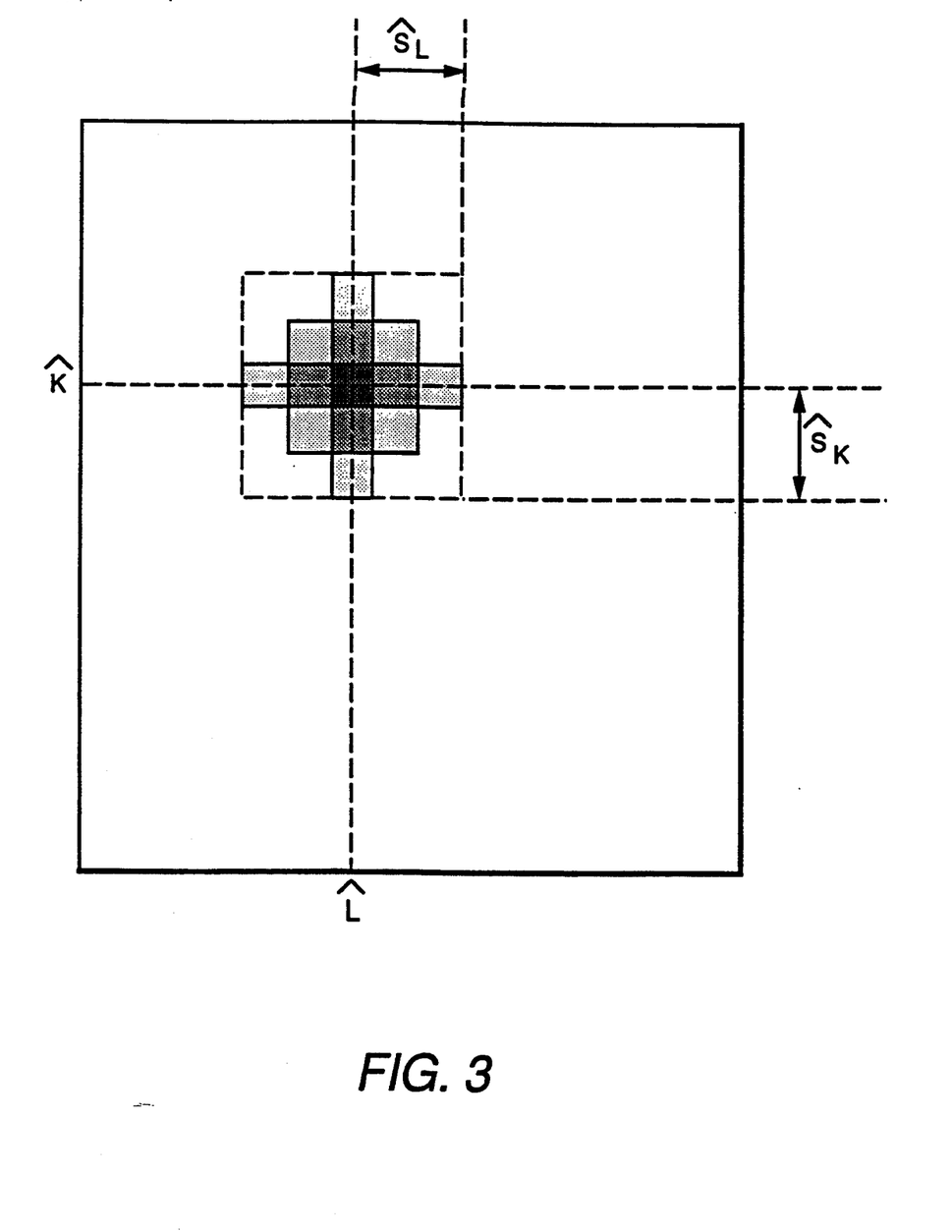
FIGS. 3 and 4 illustrate alternative embodiments of a method for producing compressed intensity images in accordance with the invention.
Figure 4:
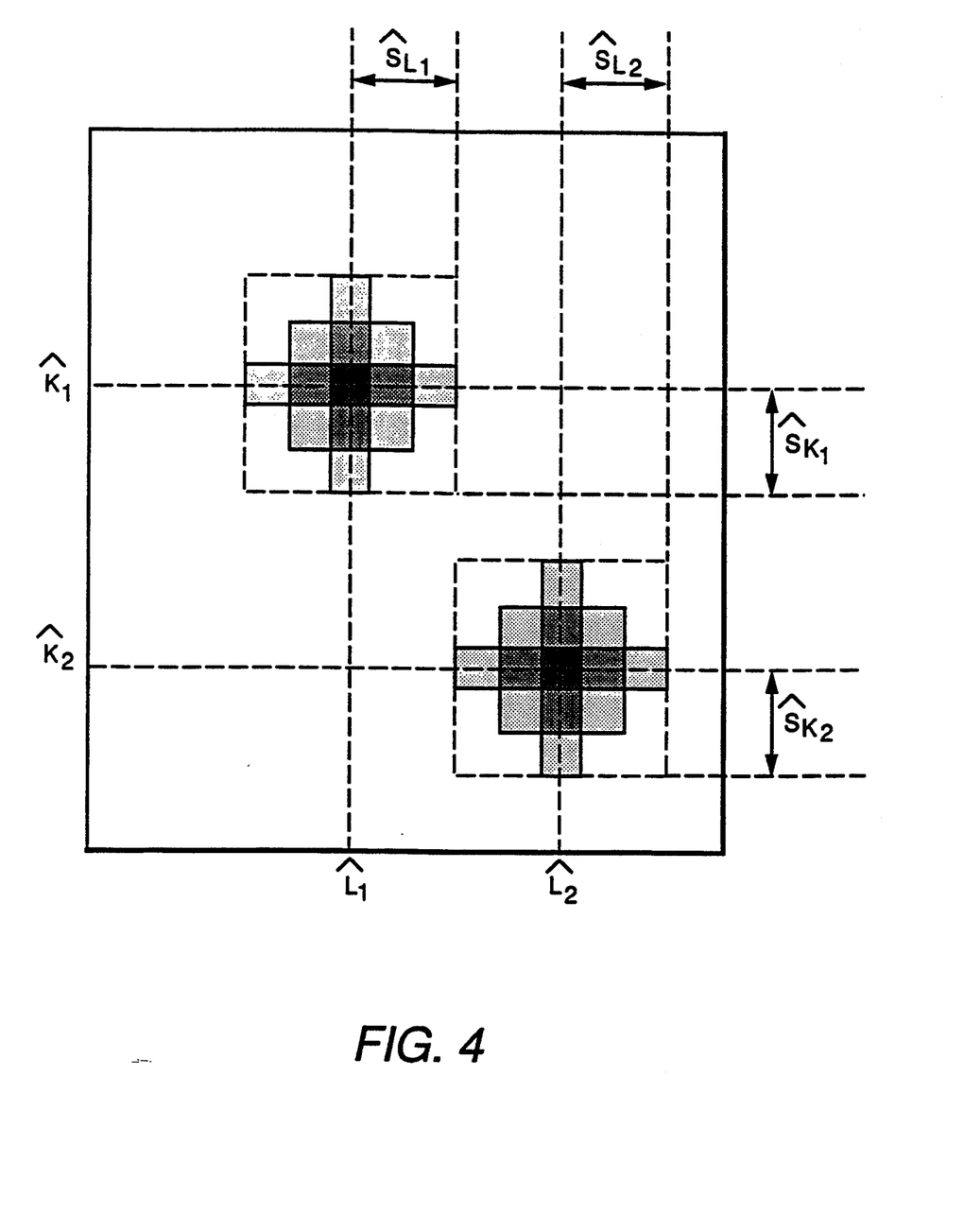

One embodiment of this method of filtering a digital intensity image is illustrated in FIG. 2. Alternatively, the maximum and extent row and column pixel values, as described above, are determined by first selecting the largest intensity value in the image, designated by pixel values $\hat{K}, \hat{L}$ and constructing a "window" around it using one-half of the largest distance between pixels in the image which are a predetermined percentage of the maximum intensity, designated by pixel values $\hat{S}_K, \hat{S}_L$. This is illustrated in FIG. 3. In an alternative embodiment of this method of filtering or compressing images, the local maxima in the image may be selected and then a window is again constructed around each maxima by "thresholding" the image to those values which are at least a predetermined percentage of the maximum, as illustrated in FIG. 4, by $(\hat{K}_1, \hat{L}_1), (\hat{K}_2, \hat{L}_2), (\hat{S}_{K1}, \hat{S}_{L1})$, and $(\hat{S}_{K2}, \hat{S}_{L2})$. Finally, the remaining pixels in each of the windows corresponding to the local maxima are used to calculate the mean and variance row and column pixel locations for that window by the method previously applied to a complete intensity image. Once the image is filtered, the mean and variance row and column pixel estimates for each window are stored. Alternatively, the maximum and extent row and column pixel values are stored. It will be understood that this same filtering method may be applied to target velocity images as well as target position images.

Once the images are compressed, image reconstruction or decompression takes place by transmitting to an image generator the filtering-produced pixel values that have been stored and producing a digital image with the image generator comprised of K columns and L rows of pixels and having a compressed intensity image corresponding to the filtering-produced pixel values. Where the stored pixel values are mean and variance row and column pixel estimates, this comprises constructing a two-dimensional Gaussian distributed intensity image having the same mean and variance. Alternatively, where the stored values are maximum and extent pixel values, a two-dimensional uniform intensity image having the same maximum and extent may be produced.

It will now be appreciated by one skilled in the art that image compression and decompression may take place at various locations in signal processor 200 other than those illustrated by FIG. 1A. Essentially, any signal processing that takes place on a per target basis, as illustrated in FIG. 1, may be compressed and decompressed for improved computational efficiency and reduced memory utilization. Likewise, image compression and decompression, as previously described, by its nature must introduce errors into the decompressed or reconstructed image. Nonetheless, in the context of the present invention, the errors introduced have proven not to substantially degrade the performance of the image processor. Thus, it will now be appreciated that processing one or more data images in accordance with the invention to produce updated reference images may begin with compressed intensity images in place of complete reference intensity images. It will also be appreciated that computational efficiency is gained from the use of a Kalman prediction filter for prediction filters 250 and 260 in combination with the image compression and decompression previously described. The compressed nature of the target information, as previously described makes it particularly convenient to apply the Kalman filter prediction equations previously discussed.

While only certain features of the invention have been illustrated and described herein, many modifications, substitutions, changes and equivalents will now occur to those skilled in the art. For example, an alternative embodiment of the invention may include filter 220 and image generator 255 without filters 250 and 260. Such an embodiment may prove satisfactory where a single data image corresponds to the reference time so that no prediction forward or backward is necessary for satisfactory performance. This embodiment operates as previously described except that the reference images are employed for the steps of the previous embodiment involving the predicted images. Likewise, a significant amount of the image processing may be performed in parallel for improved computational efficiency. For example, the processing of image pixels in accordance with the invention may be performed by parallel processors, each processor dedicated to particular pixel locations. It is, therefore, to be understood that the appended claims are intended to cover all such modifications and changes that fall within the true spirit of the invention.

What is claimed is:

1. An image processor for producing updated intensity images for use in detecting and tracking a plurality of targets, said image processor comprising:

a first and a second plurality of memory locations for storing intensity images; and a signal processor, responsive to a plurality of externally derived intensity images, for producing the updated intensity images, said signal processor being coupled to said first and said second plurality of memory locations, said externally derived intensity images including a plurality of reference images, said first plurality of memory locations for storing said reference images, respective pairs of said reference images including information about the location and the change in location of at least one of said targets during a predetermined time interval, and said externally derived intensity images including at least one intensity image incorporating target detection signals received providing information about the locations of said targets during a particular time interval relative to said predetermined time interval, said second plurality of memory locations for storing said at least one intensity image;

said signal processor comprising a closed loop feedback system for providing a plurality of images for updating said reference images in response to said at least one intensity image, said system including:

a first filter responsive to said plurality of reference images for producing a simulated image of said at least one intensity image; and an image generator for forming a plurality of images for updating said reference images by combining said simulated image with said at least one intensity image.

2. An image processor for producing updated intensity images for use in detecting and tracking a plurality of targets, said image processor comprising:

a first and second plurality of memory locations for storing intensity images; and a signal processor, responsive to a plurality of externally derived intensity images, for producing the updated intensity images, said signal processor being coupled to said first and said second plurality of memory locations, said externally derived intensity images including a plurality of reference images, said first plurality of memory locations for storing said reference images, respective pairs of said reference images including information about the location and the change in location of at least one of said targets during a predetermined time interval, and said externally derived intensity images including at least one intensity image incorporating target detection signals received providing information about the locations of said targets during a particular time interval relative to said predetermined time interval, said second plurality of memory locations for storing said at least one intensity image;

said signal processor comprising a closed loop feedback system for producing a plurality of images for updating said reference images in response to said at least one intensity image, said system including:

a first filter responsive to said plurality of reference images for producing a simulated intensity image of said at least one intensity image;

an image generator for forming a plurality of combined images by combining said simulated intensity image with said at least one intensity image; and a second filter responsive to said combined images for providing said plurality of images for updating said reference images.

3. The image processor of claim 2, wherein said signal processor comprises a digital signal processor, each of said images for updating said reference images, and said reference images, being comprised of pixels, each of said pixels having an intensity value.

4. The image processor of claim 2, wherein said first plurality of memory locations for storing said reference images as compressed intensity images;

said image processor further comprising a signal processor for producing reference images from compressed intensity images and for producing compressed intensity images from reference images.

5. The image processor of claim 3, wherein said first filter comprises a prediction filter for producing a plurality of predicted images from said reference images and a sensor simulation filter for producing said simulated intensity image from said plurality of predicted images.

6. The image processor of claim 5, wherein said second filter comprises a prediction filter for producing said plurality of images for updating said reference images from said combined images.

7. The image processor of claim 6, wherein each of said prediction filters comprises a Kalman prediction filter.

8. The image processor of claim 6, wherein said image generator for forming said plurality of combined images by separately combining each of said predicted images with said at least one intensity image and said simulated intensity image so that the differences between said at least one intensity image and said simulated image are incorporated into said plurality of combined images.

9. The image processor of claim 8, wherein said image generator for forming said combined images in accordance with the equation $$C_k = P_k \times D_k / S_k$$

where $C_k, P_k, D_k$, and $S_k$ are image intensities for corresponding pixels of, respectively, the combined image being formed, one of said predicted images, said at least one intensity image, and said simulated intensity image.

10. The image processor of claim 8, wherein said digital signal processor comprises a microprocessor.

11. A method for producing intensity images for use in detecting and tracking a plurality of targets, said images being formed with an image processor by combining a plurality of externally derived intensity images, at least one of said externally derived intensity images being comprised of converted target detection signals received, said at least one intensity image constituting a converted intensity image, said detection signals providing information about locations of said targets during a particular time interval, others of said externally derived intensity images comprising a plurality of reference images, respective pairs of said reference images providing information about location and change in location of at least one of said targets during a predetermined time interval relative to said particular time interval, said method comprising the steps of:

producing a simulated intensity image of said at least one externally derived converted intensity image from said reference images by filtering said reference images; and forming a plurality of combined intensity images by combining said simulated intensity image with said converted intensity image.

12. The method of claim 11, and further comprising, before the producing step, the steps of:

receiving target detection signals for said plurality of targets; and converting said received target detection signals into said at least one intensity image.

13. The method of claim 11, and, following the forming step, further comprising the steps of:

producing a plurality of updated reference images from said combined intensity images by filtering said combined intensity images; and recursively performing the previously recited steps of producing a simulated intensity image, forming a plurality of combined intensity images, and producing a plurality of updated reference images until the differences between the last produced simulated intensity image and said converted intensity image converge to a predetermined level.

14. The method of claim 13, and further comprising the additional steps of:

producing a residual intensity image corresponding to the differences between said last produced simulated image and said converted image after the convergence to a predetermined level;

forming a pair of reference images from said residual intensity image providing information about location and change in location of another target; and recursively performing the steps of producing another simulated intensity image, forming a plurality of combined intensity images, and producing a plurality of updated reference images until the differences between the last produced another simulated intensity image and said converted intensity image converge to a predetermined level.

15. The method of claim 13, and further including the step of storing said reference images in said first plurality of memory locations as compressed intensity images; and wherein the step of producing a simulated intensity image further includes the step of forming reference images from said compressed intensity images; and wherein the step of producing a plurality of updated reference images from said combined images further includes the step of forming compressed updated reference images from said updated reference images.

16. The method of claim 13, wherein at least another of said externally derived images is comprised of converted target detection signals received, said at least another externally derived image constituting another converted intensity image, the last-recited converted target detection signals providing information about locations of said targets during another time interval;

wherein the step of producing a simulated intensity image comprises producing a simulated intensity image of said another converted intensity image;

wherein the forming step comprises forming a plurality of combined intensity images by combining each of said simulated intensity images with the corresponding converted intensity image; and wherein the step of recursively performing the previously recited steps is performed until the differences between each of said last produced simulated intensity images and the corresponding converted intensity image converge to a predetermined amount.

17. The method of claim 13, wherein the step of producing a simulated image comprises the steps of:

producing a plurality of images predicting the locations of said targets during said particular time interval by applying said reference images to a prediction filter;

forming a target prediction image by superpositioning said plurality of predicted images; and applying said target prediction image to a sensor simulation filter in order to produce said simulated image.

18. The method of claim 17, wherein the step of forming said combined intensity images comprises the step of producing a plurality of combined images in a manner in which each of said predicted images are separately combined with said converted intensity image and said simulated image so that the differences between said converted intensity image and said simulated image are incorporated into said combined intensity images.

19. The method of claim 18, wherein said combined, predicted, converted and simulated intensity images are comprised of a corresponding number of pixels arranged in a rectangular array, the step of forming said plurality of combined intensity images being in accordance with the equation $$C_k = P_k \times D_k / S_k$$

where $C_k, P_k, D_k$, and $S_k$ are image intensities for corresponding pixels of, respectively, the image being formed by combining intensity images, one of said predicted images, said converted intensity image, and said simulated intensity image.

20. The method of claim 19, wherein the step of producing said updated reference intensity images comprises the step of applying said combined intensity images to a prediction filter.

21. The method of claim 20, wherein said target detection signals comprise vibrational energy signals.

22. The method of claim 21, wherein said vibrational energy signals comprise sonic signals.

23. The method of claim 21, wherein said vibrational energy signals comprise electromagnetic signals.

* * * * *